(12) United States Patent
Rosburg

(10) Patent No.: US 12,436,015 B2
(45) Date of Patent: Oct. 7, 2025

(54) SYSTEMS AND METHODS FOR DOSING A FLOWABLE SOLID

(71) Applicant: PepsiCo, Inc., Purchase, NY (US)

(72) Inventor: Klaus Rosburg, Brooklyn, NY (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 17/821,071

(22) Filed: Aug. 19, 2022

(65) Prior Publication Data

US 2024/0060806 A1   Feb. 22, 2024

(51) Int. Cl.
G01F 11/26 (2006.01)
A47G 19/34 (2006.01)

(52) U.S. Cl.
CPC ............ *G01F 11/262* (2013.01); *A47G 19/34* (2013.01)

(58) Field of Classification Search
CPC ................................ A47G 19/34; G01F 11/24
See application file for complete search history.

(56) References Cited

U.S. PATENT DOCUMENTS

| | | | | |
|---|---|---|---|---|
| 30,516 A * | 10/1860 | Ballantine | ............... | B65D 88/68 222/231 |
| 1,477,245 A * | 12/1923 | Conklin | ................... | G01F 11/24 222/363 |
| 1,497,772 A * | 6/1924 | Conklin | ................... | B01F 31/42 222/360 |
| 2,047,184 A * | 7/1936 | Gray | ........................ | G01F 11/24 222/360 |
| 2,123,318 A * | 7/1938 | Taylor | ...................... | G01F 11/24 222/231 |
| 2,339,781 A * | 1/1944 | Hurwitz | .................. | A47G 19/34 222/39 |
| 2,475,381 A * | 7/1949 | Erickson | .................. | B02C 11/04 222/260 |
| 2,532,698 A * | 12/1950 | Corkins | ................... | G01F 11/24 222/359 |

(Continued)

FOREIGN PATENT DOCUMENTS

| | | |
|---|---|---|
| CN | 205660159 U | 10/2016 |
| CN | 107083459 A | 8/2017 |

(Continued)

*Primary Examiner* — Paul R Durand
*Assistant Examiner* — Randall A Gruby
(74) *Attorney, Agent, or Firm* — Sterne, Kessler, Goldstein &Fox P.L.L.C.

(57) ABSTRACT

Embodiments relate to systems for dispensing a flowable solid. The system can include a body, a dosing device, and a handle. The body can include a storage volume, an inlet, an outlet, and a dosing chamber disposed between the storage volume and the outlet. The dosing device can be disposed at least partially within the dosing chamber. The dosing device can be rotatable about a horizontal axis and include a central shaft extending along the horizontal axis, a walls extending radially outward from the central shaft, dosing volumes defined in part by the walls. Each dosing volume can hold one dose of the flowable solid. The dosing device can restrict flow of the flowable solid from the storage volume to the outlet. The dosing device can rotate incrementally about the horizontal axis such that one dose of the flowable solid is dispensed through the outlet with each incremental rotation.

24 Claims, 10 Drawing Sheets

(56) References Cited

U.S. PATENT DOCUMENTS

| | | | | |
|---|---|---|---|---|
| 2,920,796 | A * | 1/1960 | Field | G01F 11/24 222/337 |
| 2,977,023 | A * | 3/1961 | Moshe | B65D 83/02 221/256 |
| 3,033,164 | A * | 5/1962 | Evers | A01K 5/025 141/248 |
| 3,118,575 | A * | 1/1964 | Mccauley | A01K 5/0275 222/368 |
| 3,169,675 | A * | 2/1965 | Gutzmann | A47G 19/34 222/360 |
| 3,272,399 | A * | 9/1966 | Walter | A47J 47/01 222/232 |
| 3,656,518 | A * | 4/1972 | Aronson | B65B 1/16 141/81 |
| 4,053,087 | A * | 10/1977 | Lack | G01F 11/24 222/359 |
| 4,162,751 | A * | 7/1979 | Hetland | G01F 11/024 222/293 |
| 4,284,030 | A | 8/1981 | Hamilton | |
| 4,957,219 | A * | 9/1990 | Robbins | G01F 11/24 222/39 |
| 5,109,893 | A * | 5/1992 | Derby | B65B 1/26 141/10 |
| 5,303,672 | A * | 4/1994 | Morris | A01K 61/80 222/650 |
| 5,375,744 | A * | 12/1994 | Henderson | G01F 11/24 222/363 |
| 5,529,221 | A | 6/1996 | Roy | |
| 6,315,170 | B1 * | 11/2001 | Thomson | G01F 11/40 222/359 |
| 7,731,063 | B2 | 6/2010 | Rusch | |
| 7,980,417 | B2 * | 7/2011 | Riley | G07F 11/16 221/277 |
| 8,025,188 | B2 | 9/2011 | White | |
| 9,400,200 | B2 * | 7/2016 | Rusch | B65D 83/06 |
| 9,643,798 | B2 * | 5/2017 | Kirchhoff | B65G 53/4633 |
| 9,903,746 | B2 * | 2/2018 | Rusch | G01F 11/24 |
| 11,051,636 | B2 * | 7/2021 | Sunesson | A47F 1/03 |
| 11,089,894 | B2 * | 8/2021 | Snediker | G01F 13/001 |
| 11,452,394 | B2 * | 9/2022 | Morello | G01F 11/24 |
| 2005/0098586 | A1 * | 5/2005 | Jensen | B65G 53/4633 222/367 |
| 2015/0276453 | A1 | 10/2015 | Rusch | |
| 2017/0030754 | A1 | 2/2017 | Marchesini | |
| 2017/0241824 | A1 | 8/2017 | Rusch | |
| 2021/0362419 | A1 | 11/2021 | Plummer et al. | |

FOREIGN PATENT DOCUMENTS

| | | | |
|---|---|---|---|
| CN | 108689092 A | | 10/2018 |
| CN | 209441753 U | | 9/2019 |
| DE | 102 19 087 A1 | | 11/2003 |
| DE | 10 2013 106 917 A1 | | 1/2015 |
| GB | 104243 A | | 3/1917 |
| GB | 434692 A | * | 9/1935 |
| WO | 2020/146917 A1 | | 7/2020 |

* cited by examiner

SYSTEMS AND METHODS FOR DOSING A FLOWABLE SOLID

BACKGROUND

The present disclosure relates to systems and methods for dispensing a flowable solid (e.g., a powder, granules, cereals, or oats). More specifically, the present disclosure relates to containers for dispensing consistent and accurate doses of a flowable solid.

BRIEF SUMMARY

Some embodiments are directed to a system for dispensing a flowable solid, the system including a body, a dosing device, and a handle. In some embodiments, the body includes a storage volume defined by the body; an inlet; an outlet disposed at a bottom of the body; and a dosing chamber disposed between the storage volume and the outlet. In some embodiments, the dosing device is disposed at least partially within the dosing chamber and is rotatable about a horizontal axis. In some embodiments, the dosing device includes a central shaft extending along the horizontal axis, a plurality of walls extending radially outward from the central shaft, a plurality of dosing volumes defined in part by the plurality of walls, wherein each dosing volume is configured to hold one dose of the flowable solid. In some embodiments, the dosing device is configured to restrict flow of the flowable solid from the storage volume to the outlet. In some embodiments, the dosing device is configured to rotate incrementally about the horizontal axis such that one dose of the flowable solid is dispensed through the outlet with each incremental rotation. In some embodiments, the handle is hingedly coupled to the body and configured to move between a first position and a second position. In some embodiments, the dosing device is configured to rotate through a single incremental rotation each time the handle moves from the first position to the second position to dispense a dose of the flowable solid.

In some embodiments, the plurality of dosing volumes includes a first dosing volume. In some embodiments, when the handle is in the first position, the first dosing volume is in communication with the storage volume, and in response to a downward force applied to the handle, the dosing device rotates such that the first dosing volume is in communication with the outlet.

In some embodiments, a first dosing volume of the plurality of dosing volumes is in communication with the storage volume, and a second dosing volume of the plurality of dosing volumes is not in communication with the storage volume.

In some embodiments, the first dosing volume is configured to receive the flowable solid from the storage volume by gravity.

In some embodiments, the dosing device comprises a first side wall disposed at a first end of the central shaft, a second side wall disposed at a second end of the central shaft, wherein the first side wall and the second side wall are each oriented perpendicular to the horizontal axis and perpendicular to the plurality of walls.

In some embodiments, the handle is coupled to the first side wall and to the second side wall.

In some embodiments, the plurality of walls comprises a first wall and a second wall. In some embodiments, a first dosing volume of the plurality of dosing volumes is defined in part by the first wall, the second wall, the first side wall, and the second side wall.

In some embodiments, the dosing device is removable from the body;

In some embodiments, when the handle moves from the second position to the first position, the dosing device does not rotate.

In some embodiments, a full rotation of the dosing device is equal to 3 to 5 incremental rotations.

In some embodiments, the handle is coupled to the body by a tension spring, wherein the tension spring extends as the handle moves from the first positions to the second position.

In some embodiments, the system further includes a ratchet wheel coupled to the dosing device. In some embodiments, the handle includes a projection that engages with the ratchet wheel to rotate the ratchet wheel when the handle moves from the first position to the second position.

In some embodiments, the handle is configured to move from the first position to the second position in response to a downward force applied to the handle.

In some embodiments, the system further includes a stand, and the body is coupled to the stand.

In some embodiments, each incremental rotation is 45 degrees to 90 degrees.

In some embodiments, each dose has an equal volume.

Some embodiments are directed to a system for dispensing a flowable solid comprising a body comprising a storage volume, an inlet, an outlet, and a dosing chamber; a dosing device disposed at least partially in the dosing chamber, the dosing device comprising a plurality of dosing volumes defined by walls extending radially outward from a central shaft of the dosing device, the dosing device disposed at least partially within the dosing chamber and rotatable about a horizontal axis, the dosing device configured to restrict flow of the flowable solid from the storage volume to the outlet; and a handle configured to move between a first position and a second position, the handle configured to move from the first position to the second position in response to a downward force applied to the handle. In some embodiments, the dosing device is configured to rotate incrementally in response to the handle moving from the first position to the second position. In some embodiments, the dosing device is configured to dispense a dose of the flowable solid with each incremental rotation. In some embodiments, each dose has an equal volume.

In some embodiments, the dosing device is configured to not rotate when the handle moves from the second position to the first position.

In some embodiments, the dosing device has an order of rotational symmetry of 5.

In some embodiments, the plurality of dosing volumes includes a first dosing volume. In some embodiments, when the handle is in the first position, the first dosing volume is in communication with the storage volume, and as the handle moves from the first position to the second position, the dosing device rotates such that the first dosing volume is in communication with the outlet.

BRIEF DESCRIPTION OF THE FIGURES

The accompanying drawings, which are incorporated herein and form part of the specification, illustrate the present disclosure and, together with the description, further serve to explain the principles of the disclosure and to enable a person of skill in the relevant art to make and use the invention.

DETAILED DESCRIPTION

Powders, such as beverage concentrates, sugar, etc., are often sold in bulk in large containers. Not only is it difficult to accurately remove a consistent amount of powder from these containers, doing so can be messy and slow. To accurately remove a dose of powder, a user may have to use a scoop to remove the powder. But the scoop may remove excess powder (requiring the user to level the powder to get an accurate amount or dose of the powder) or too little powder (requiring the user to scoop again to get an accurate amount or dose of the powder). Or to achieve an accurate dose in a single scoop, a user may have to scoop an excess amount, then use another tool or the user's fingers to level the powder. These scoops are often used by multiple people and stored in the container itself and thus may become coated by powder or other substances.

Other dispensers may allow a user to dispense the powder without a scoop, but may provide little control over the amount dispensed. For example, containers with spouts (e.g., sugar dispensers) can dispense powder by pouring, but aside from estimating how much has been poured, there is no reliable way to control the amount of sugar dispensed, and the accuracy of the pour changes with the flow rate of the powder as the volume of powder remaining in the container decreases. Further, users may have to touch the spout to open and allow flow of powder.

Other dispensers may include dispensing devices that rotate about a vertical axis, but these can require more space, create dead zones of flowable solid that cannot reach the dispensing device, and can require an awkward motion to dispense the contents. Such devices can also be challenging to disassemble, which can complicate cleaning.

Embodiments described herein overcome these and other challenges by providing—among other benefits—a system that consistently dispenses accurate doses of powder without measuring or requiring separate components like scoops, that is easily disassembled, and allows for user-friendly operation. For example, to dispense doses using systems disclosed herein, a user can apply a downward force to a handle, and the system dispenses the dose of flowable solid without any other user action required.

As shown throughout the figures, some embodiments are directed to a system for storing, dosing, and dispensing a flowable solid. A flowable solid is a volume of material that is formed of solid fragments or chunks of the material such that the volume of material can flow (e.g., when poured). Examples include powder or granules (e.g., granulated sugar, beverage concentrate, protein powder). The systems described herein can include a body for storing the flowable solid, a dosing device, and a handle that, when actuated, causes the dosing device to dispense one dose of a flowable solid.

Figure 3:
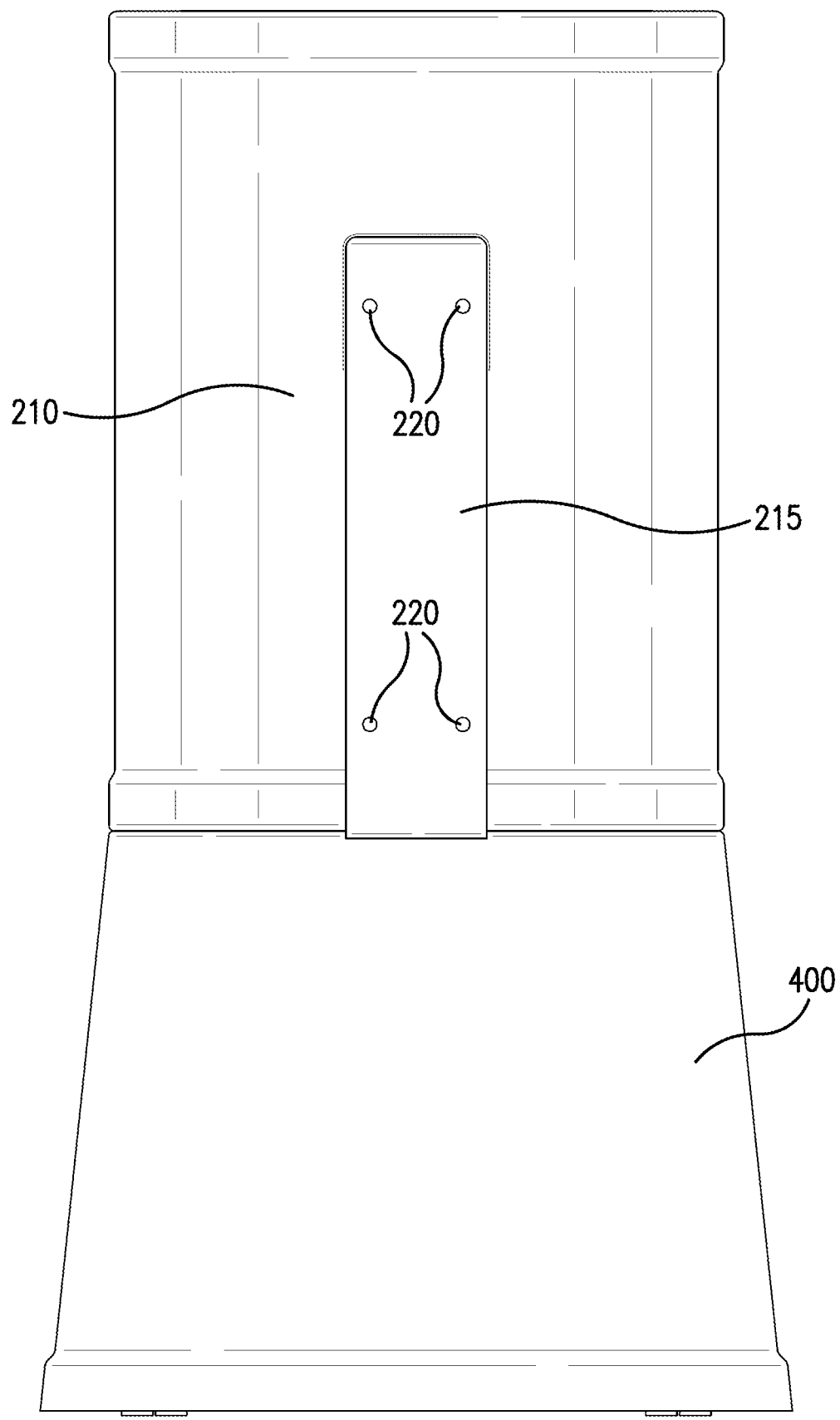
FIG. 3 shows a back view of the dispensing system of FIG. 1.
Figure 4:
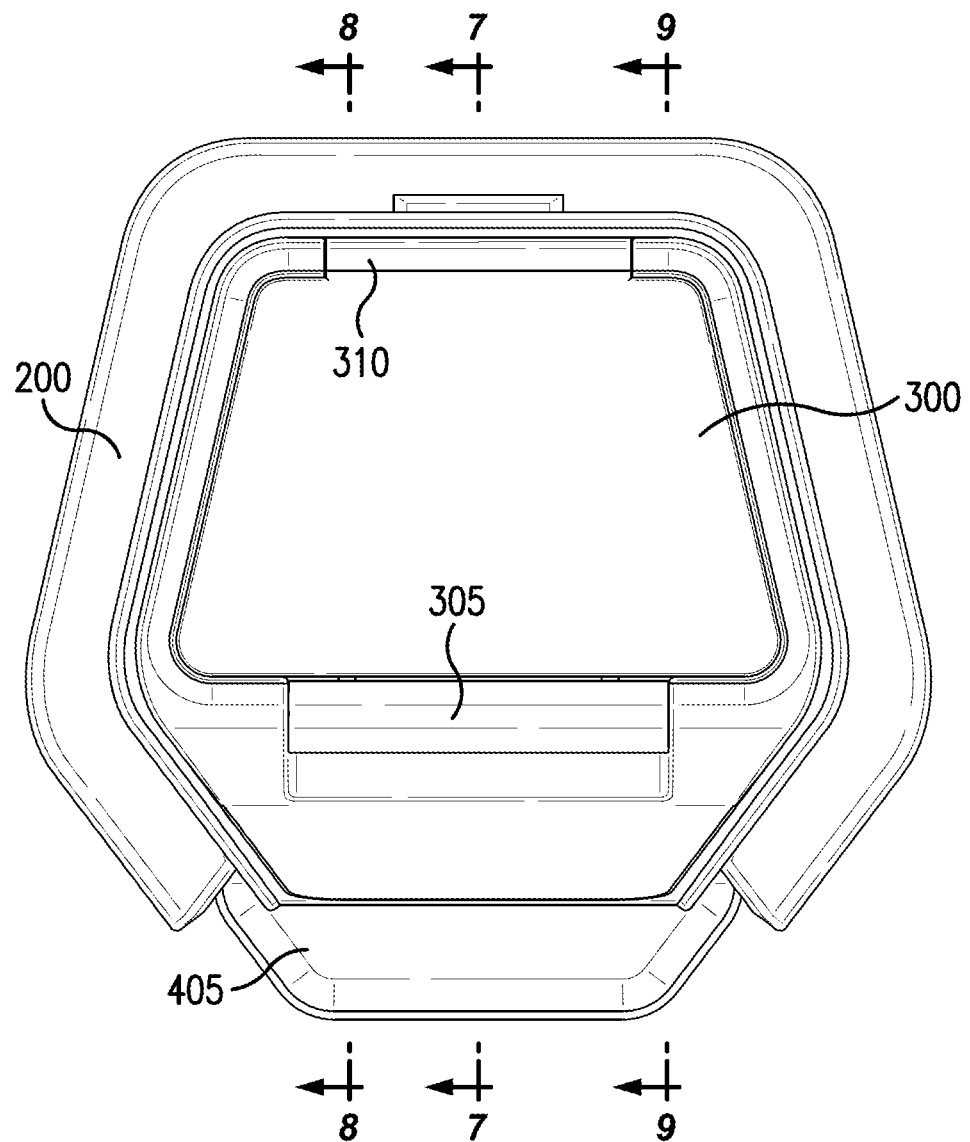
FIG. 4 shows a top view of the dispensing system of FIG. 1.
Figure 5:
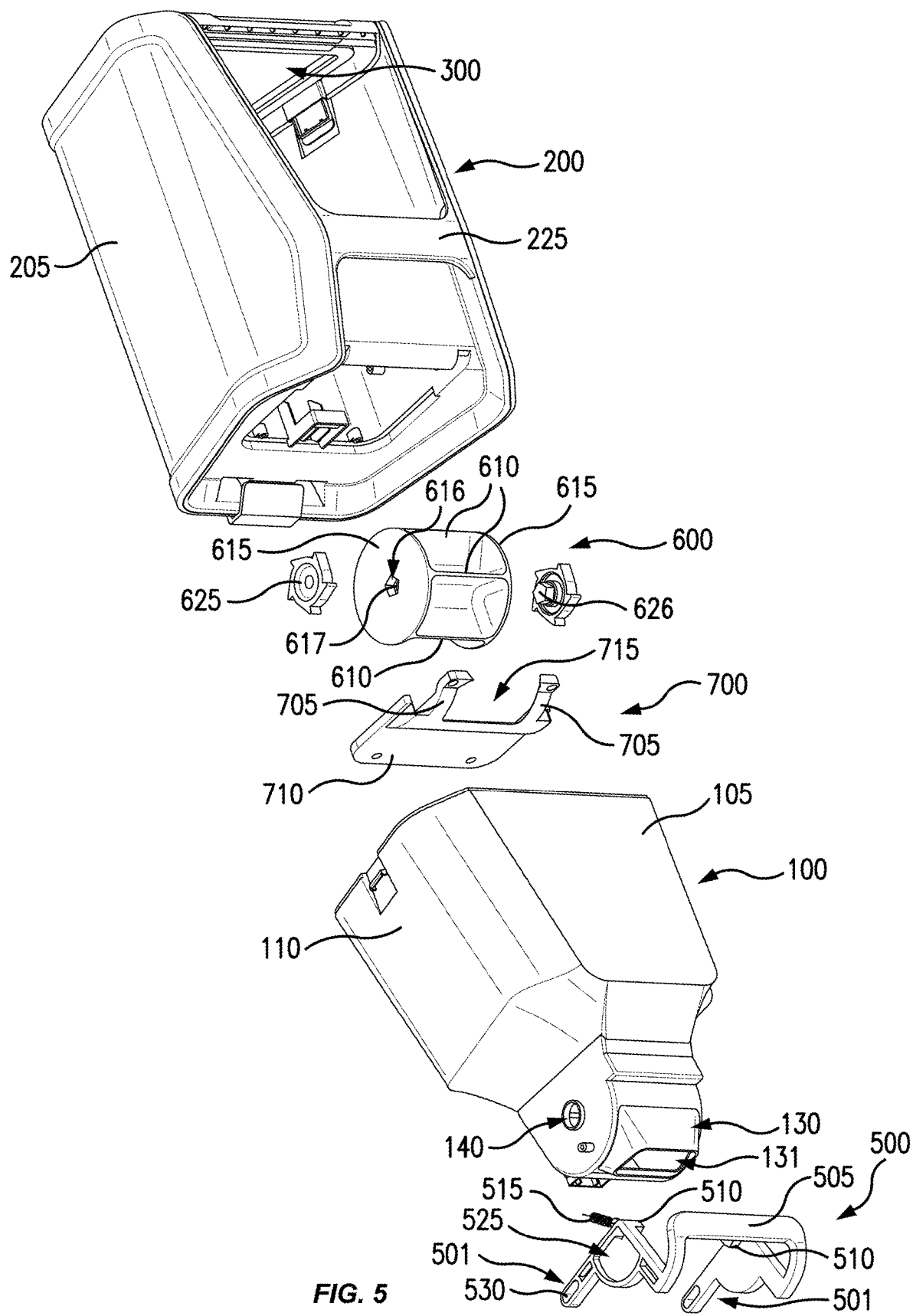
FIG. 5 shows an exploded view of the dispensing system of FIG. 1.

FIGS. 1-4 show various views of systems disclosed herein (e.g., system 10). FIG. 5 shows an exploded view of system 10. As shown in FIG. 5, system 10 can include body 100, outer shell 200, closure 300, base 400, handle 500, dosing device 600, and shield 700. In some embodiments, system 10 can be easily assembled and disassembled. For example, closure 300 can be removably coupled to shell 200, shell 200 can be removably coupled to base 400, closure 300 can be removably coupled to shell 200, and dosing device 600 can be removably coupled to body 100. This allows for easy disassembly of the components of system 10, which simplifies cleaning each component.

In some embodiments, as shown in FIGS. 1-2 and 5-9, system 10 can include body 100 that can contain a flowable solid (e.g., flowable solid 800). In some embodiments, body 100 includes flowable solid 800 disposed therein. In some embodiments, body 100 includes front wall 105, side walls 110, and back wall 115. In some embodiments, body 100 includes an interior volume defined in part by front wall 105, side walls 110, and back wall 115. In some embodiments, the interior volume includes storage volume 120 and dosing chamber 125. In some embodiments, body 100 includes inlet 128 and outlet 130. In some embodiments, inlet 128 is disposed proximate to a top of body 100 and outlet 130 is disposed proximate to a bottom of body 100. In some embodiments, flowable solid 800 can be added to storage volume 120 through inlet 128. In some embodiments, dosing device 600 is disposed at least partially within dosing chamber 125 and restricts the flow of flowable solid 800 from storage volume 120 to outlet 130. Dosing device 600 is discussed in detail below.

Figure 1:
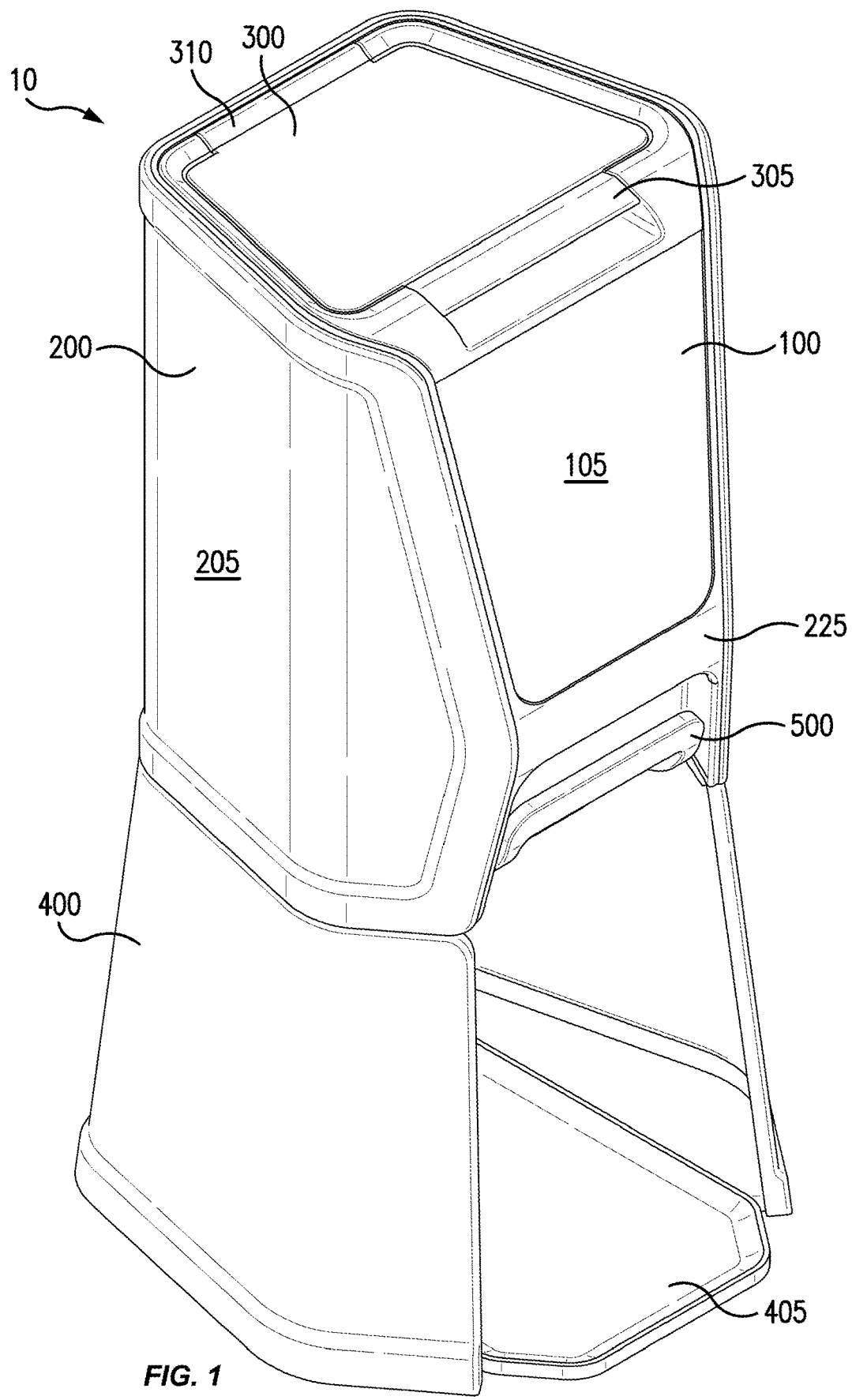
FIG. 1 shows a perspective view of a dispensing system according to some embodiments.
Figure 2:
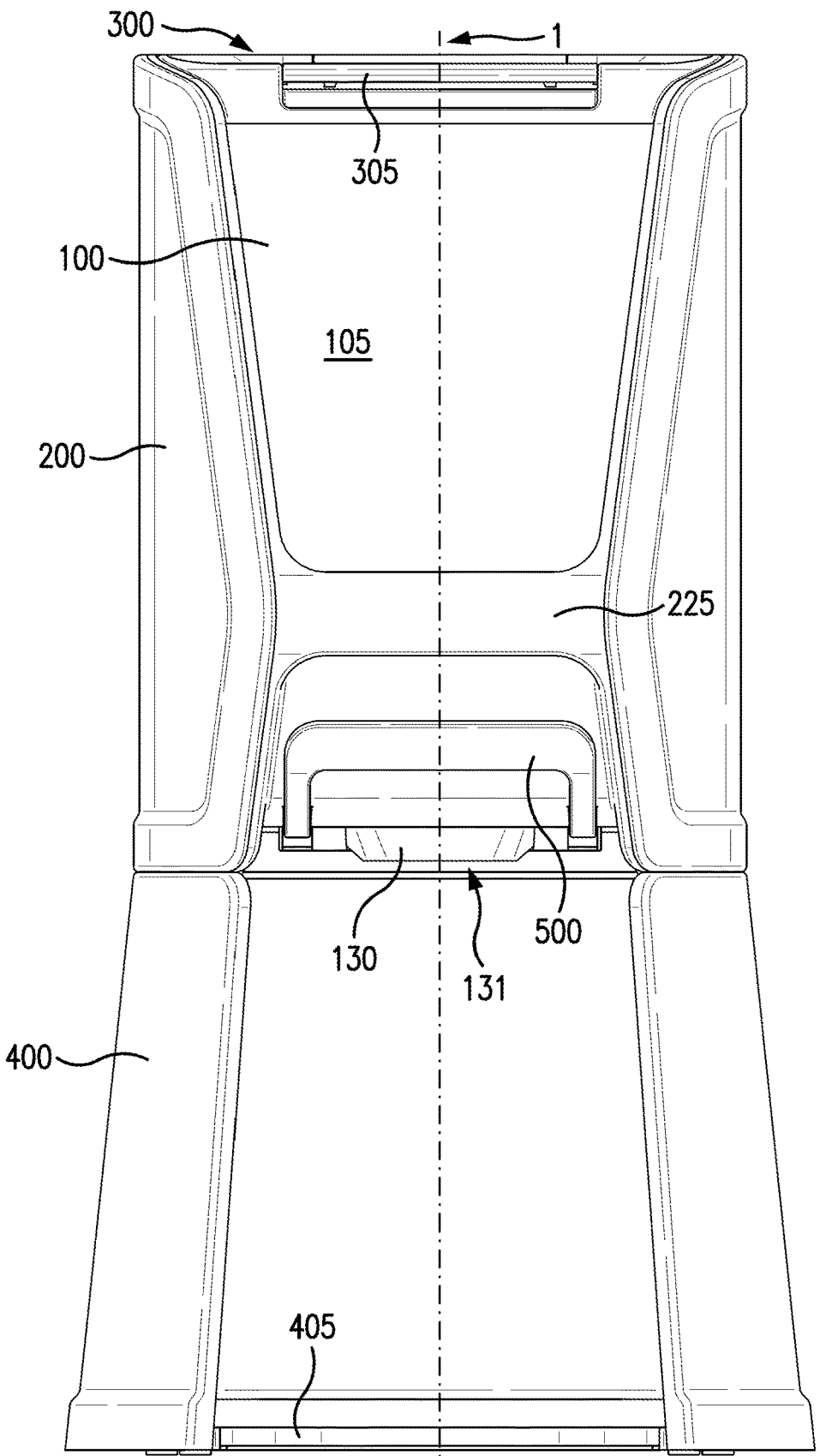
FIG. 2 shows a front view of the dispensing system of FIG. 1.

In some embodiments, system 10 includes shell 200 that can at least partially surround body 100. In some embodiments, shell 200 includes side walls 205, back wall 210, and bar 225. In some embodiments, as shown in FIGS. 1-3, shell 100 can couple to base 400 so that system 10 is a freestanding system. For example, when shell 200 is coupled to base 400, system 10 can sit on a countertop, table, floor, etc. In some embodiments, system 10 does not include base 400 and can sit on a countertop or table or be wall mounted. In some embodiments, shell 200 includes mount 215 on back wall 210 for mounting system 10 to a vertical surface, such as a wall, cabinet, etc. In some embodiments, mount 215 includes one or more holes 220 for securing mount to a vertical surface. In some embodiments, mount 215 is removably coupled to shell 200 for easy removal (e.g., for refilling, cleaning, etc.). In some embodiments, system 10 does not include base 400 and is wall-mounted.

In some embodiments, system 10 includes closure 300 that couples to shell 200 and covers inlet 128 of body 100. In some embodiments, as shown in FIG. 1, closure 300 can include latch 305 that keeps closure 300 closed. In some embodiments, closure 300 can be opened by releasing latch 305. In some embodiments, as shown in FIGS. 1 and 4, closure 300 rotates about hinge 310 to open. In some embodiments, closure 300 is not hinged, and the entire closure 300 is removable. In some embodiments, when closure 300 is opened, inlet 128 of body 100 is exposed, which can allow easy access to storage volume 120. In some embodiments, flowable solid 800 can be added to storage volume 120 when closure 300 is open.

In some embodiments, system 10 includes base 400 that can couple to shell 200 to allow system 10 to be a free-standing system. In some embodiments, as shown in FIGS. 1-3, body 100 can be coupled to shell 200, and shell 200 can be coupled to base 400. In some embodiments, base 400 includes drip tray 405.

Figure 7A:
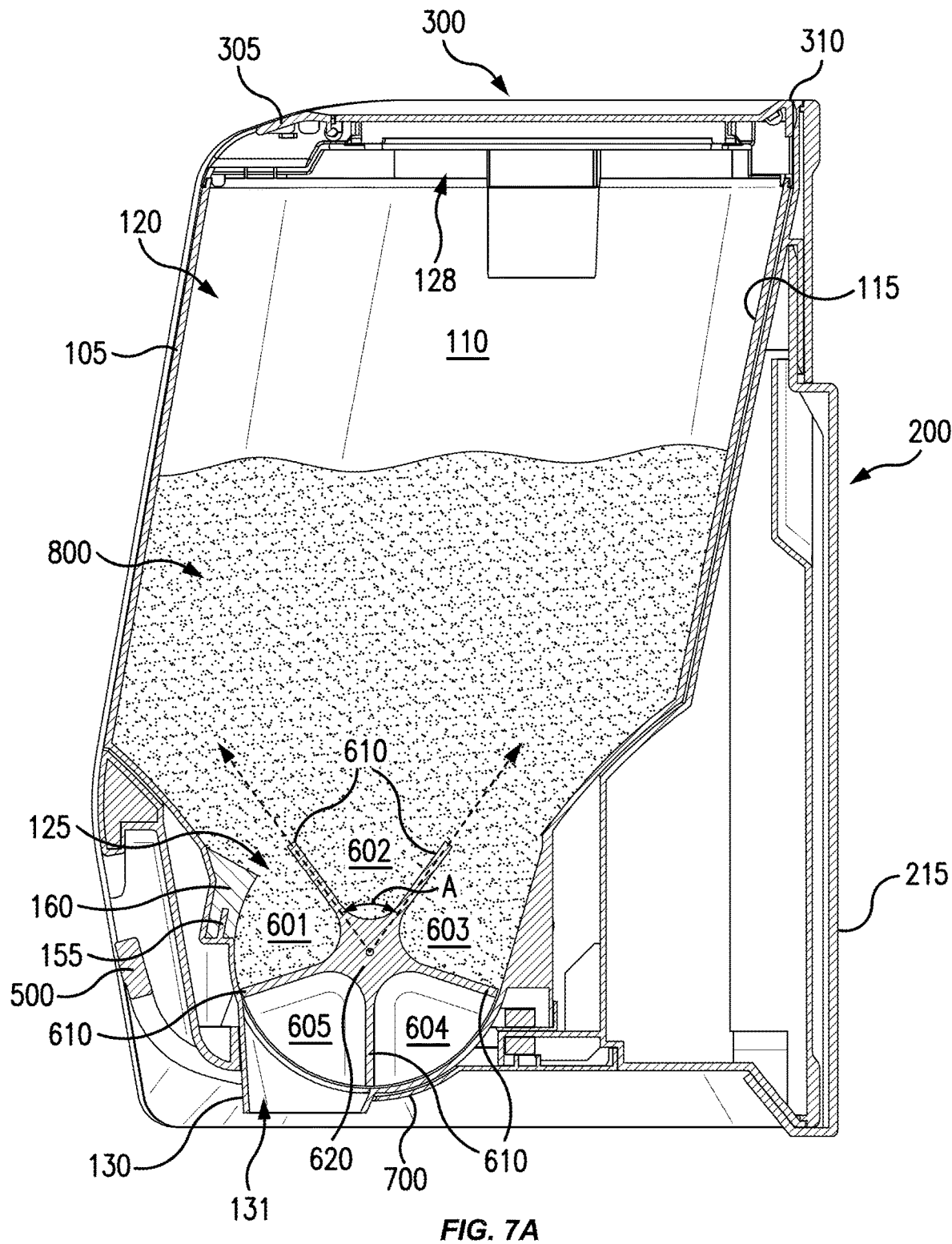
FIG. 7A shows a cross-section of the dispensing system of FIG. 1 along line 7-7 with the handle in the first position.
Figure 7B:
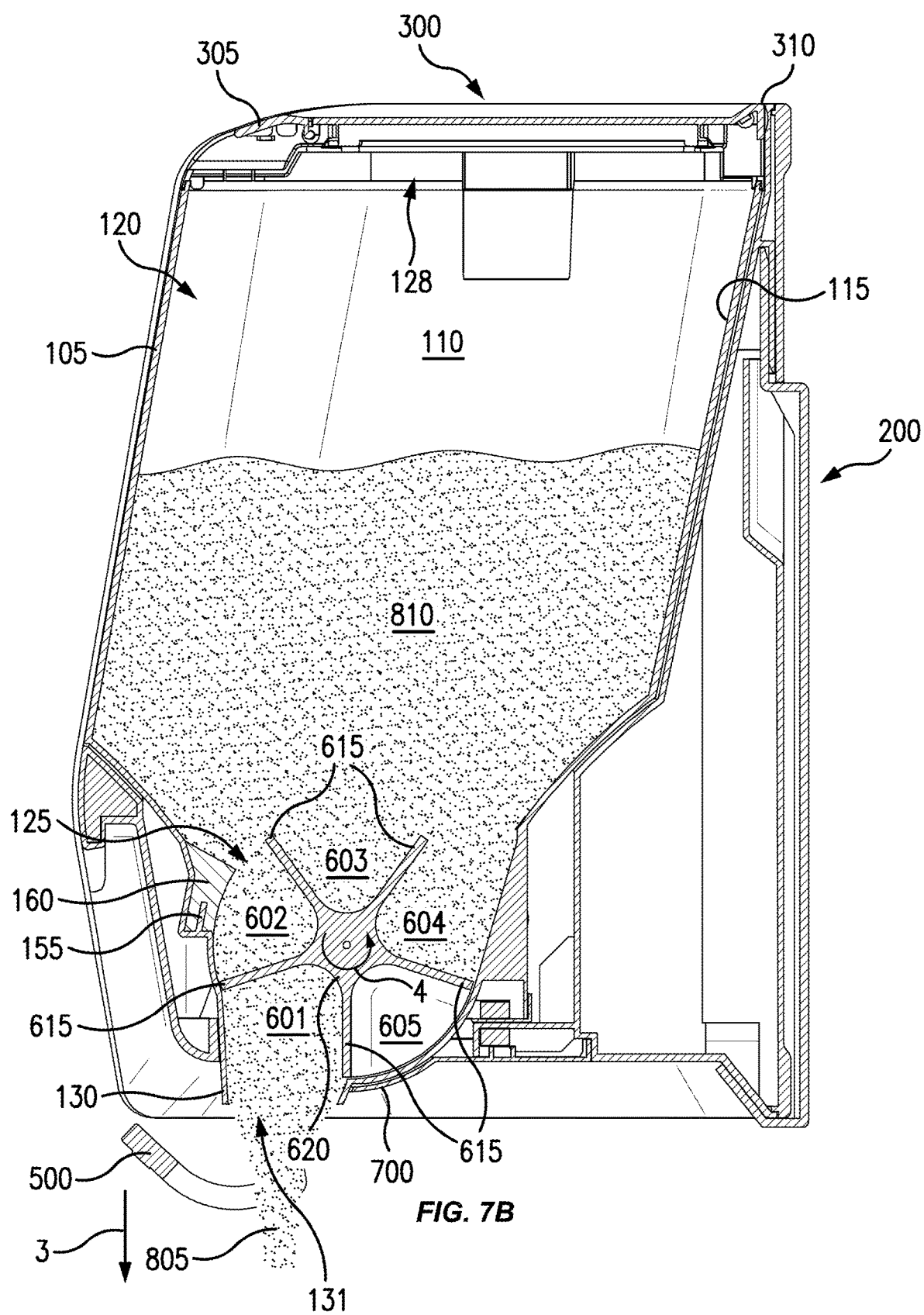
FIG. 7B shows a cross-section of the dispensing system of FIG. 1 along line 7-7 with the handle in the second position.

In some embodiments, system 10 includes handle 500 that is configured to move between a first position (shown in FIG. 7A) to a second position (shown in FIG. 7B). In some embodiments, handle 500 is coupled to body 100 and dosing device 600. As discussed in detail below, in some embodiments, when handle 500 moves the first position to the second position, dosing device 600 can rotate to dispense one dose of flowable solid 800.

Figure 6:
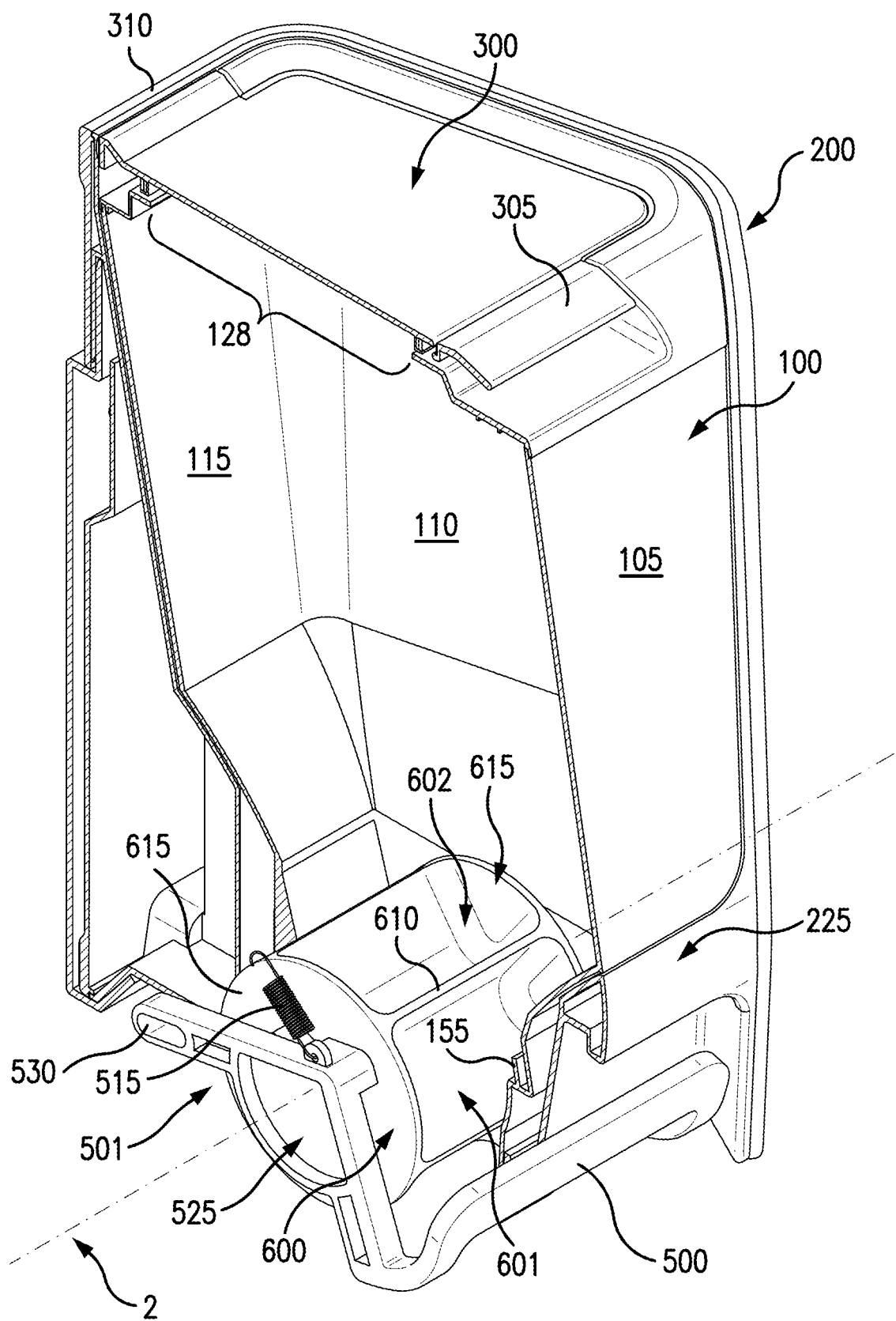
FIG. 6 shows a perspective view of the dispensing system of FIG. 1 with a portion of the body and shell broken away.

In some embodiments, system 10 includes dosing device 600 that is configured to hold and dispense doses of flowable solid 800. In some embodiments, dosing device 600 is disposed in dosing chamber 125 between storage volume 120 and outlet 130, along axis 1 shown in FIG. 2. As shown, dosing device 600 includes dosing volumes (e.g., dosing volumes 601, 602, 603, 604, and 605). Dosing device 600 rotates about axis 2 shown in FIG. 6. In some embodiments, dosing device 600 includes walls 610 disposed about central shaft 620. Central shaft 620 is coaxial with axis 2 shown in FIG. 6. As shown in FIGS. 7A and 7B, walls 610 can extend radially outward from central shaft 620. As shown in FIGS. 5 and 6, walls 610 can extend the length of central shaft 620 in the direction of axis 2. As shown in FIGS. 5 and 6, dosing device can include side walls 615 disposed on opposite ends of central shaft 620.

In some embodiments, dosing device 600 includes 3 or more dosing volumes (e.g., dosing volumes 601, 602, 603, 604, 605). Each dosing volume may be defined in part by two walls 610, side walls 615, and central shaft 620. In some embodiments, each dosing volume has a volume equal to one dose of flowable solid. In some embodiments, each dose has a volume from 15 mL to 150 mL (e.g., 30 mL to 90 mL or 50 mL to 70 mL). Although dosing device 600 is shown throughout with 5 dosing volumes, it is to be understood that the number and geometry of the dosing volumes can be changed to accommodate different dose sizes. For example, increasing the number of walls 610 will decrease the dose size. Conversely, reducing the number of walls 610 will increase the dose size. Other parameters of dosing device 600 can be adjusted to achieve a dose size, for example a length along axis 2 or a height of walls 610. In some embodiments, dosing device 600 has 2 or more (e.g., 3 or more, 4 or more, 5 or more, or 6 or more) dosing volumes.

In some embodiments, dosing device 600 restricts movement of flowable solid 800 from storage volume 120 to outlet 130. For example, dosing device 600 can be sized to fit within dosing chamber 125 such that flowable solid 800 cannot bypass dosing device 600 when not intended. In some embodiments, dosing device 600 is coupled to body 100.

In some embodiments, dosing device 600 includes a recess in each side wall 615. Dosing device 600 can include a ratchet and pawl system that rotates dosing device 600. In some embodiments, dosing device 600 includes ratchet wheel 625 that includes projection 626 (e.g., a nut or bolt) that is inserted into recess 616 (e.g., a socket) in side wall 615.

In some embodiments, ratchet wheel 625 is disposed exterior to body 100, and the projection extends through opening 140 in the side of dosing chamber 125 and into the recess. In some embodiments, dosing device 600 includes pawl 630.

In some embodiments, dosing device 600 includes two ratchet wheels 625 and two pawls 630 (e.g., one on coupled to each side wall 615). In some embodiments, dosing device 600 includes only one ratchet wheel 625 and pawl 630.

Each ratchet wheel 625 can be removably coupled to each side wall 615. In some embodiments, the recess 616 in side wall 615 includes magnet 617 that couples to projection 626 of ratchet wheel 625 such that the ratchet wheel can be magnetically coupled to side wall 615. This allows for simple disassembly, which can simplify cleaning.

Each recess 616 can be a polygon with the number of sides equal to the number of dosing volumes, and each projection 626 has a shape that corresponds to the shape of recess 616. For example, recess 616 shown in the figures is a pentagonal socket with each side aligning with one of the five dosing volumes. In some embodiments, the projection in ratchet wheel 625 is pentagonal. This ensures proper alignment of ratchet wheel 625 during reassembly.

Figure 8:
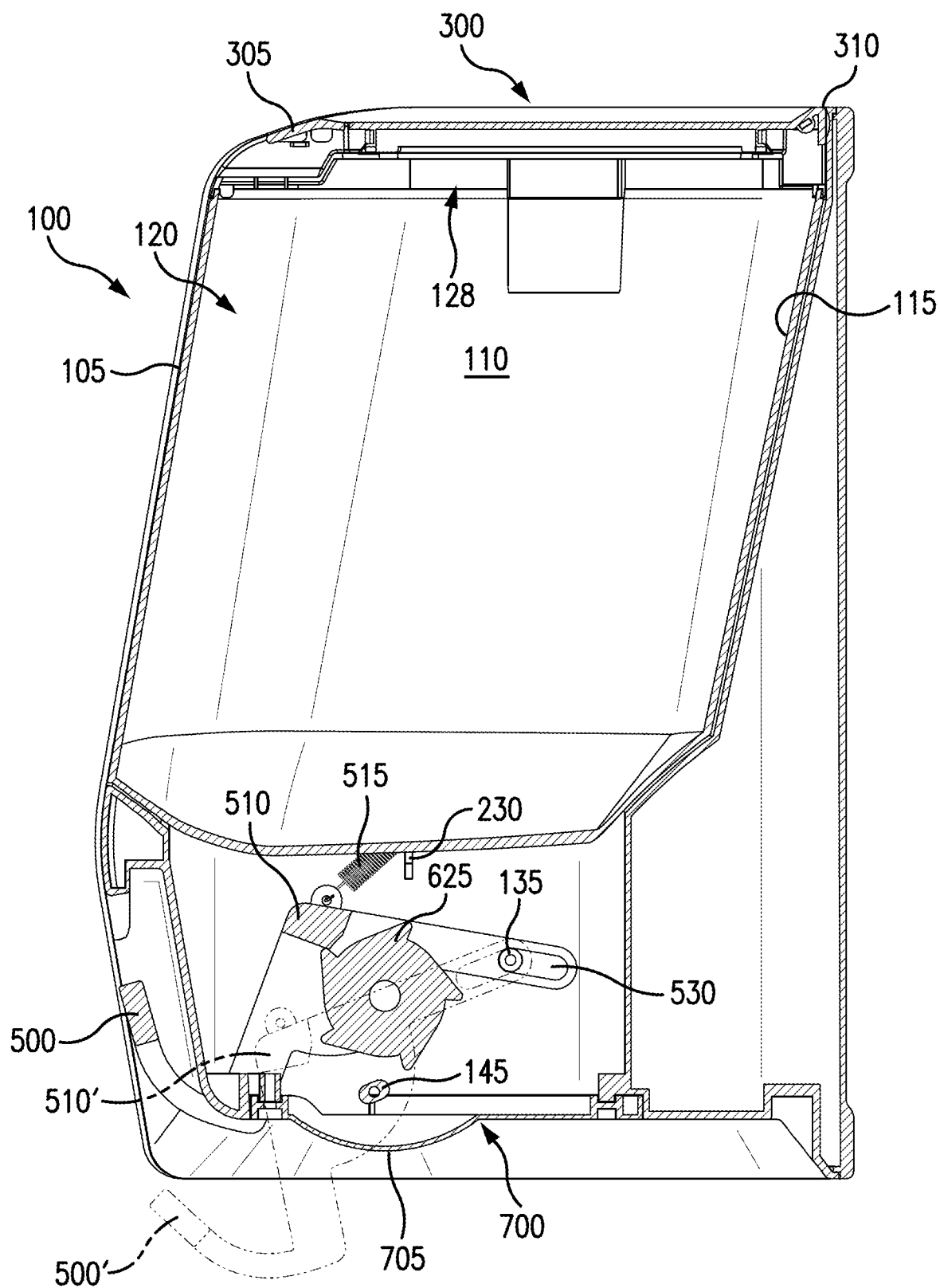
FIG. 8 shows a cross-section of the dispensing system of FIG. 1 along line 8-8.
Figure 9:
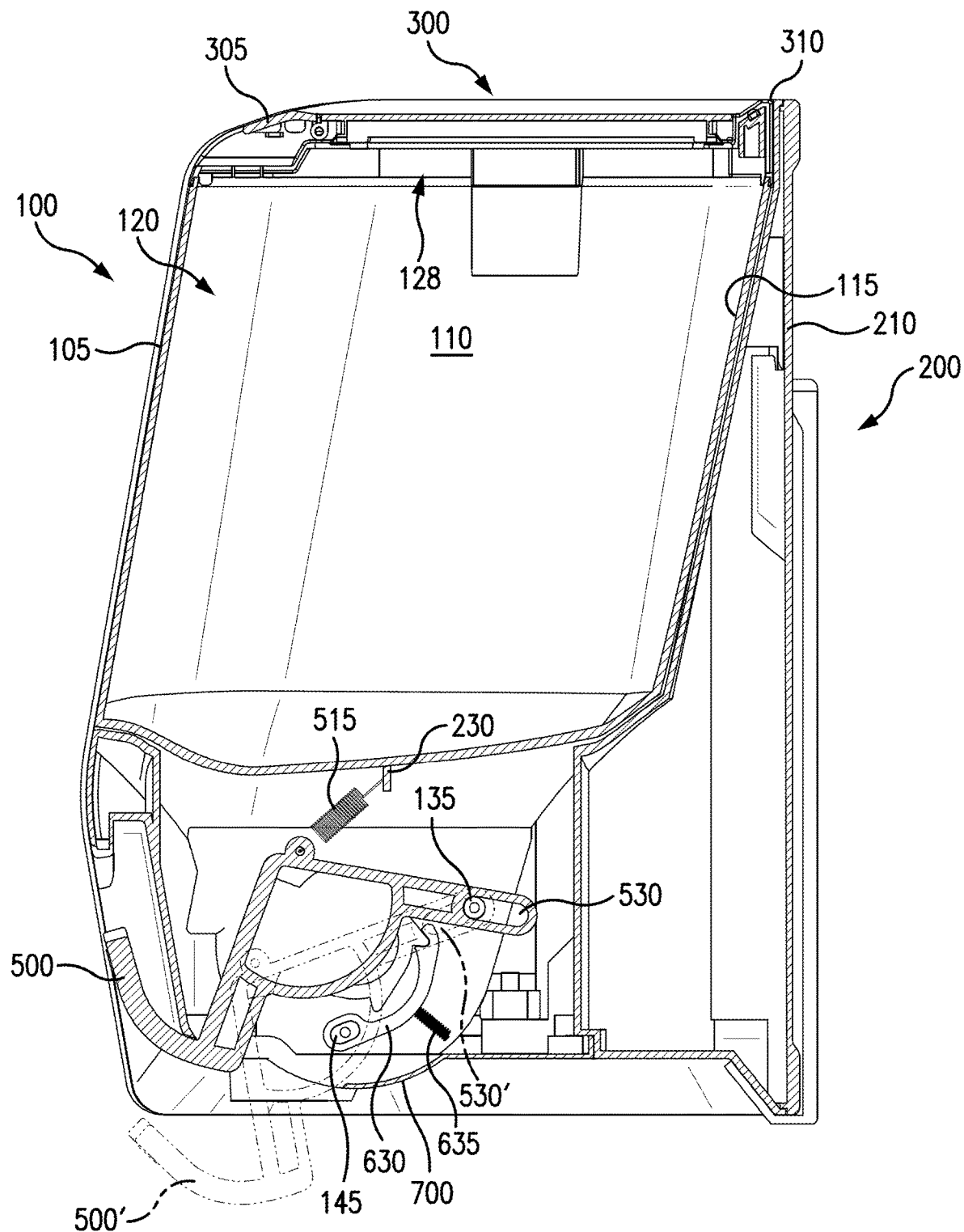
FIG. 9 shows a cross-section of the dispensing system of FIG. 1 along line 9-9.

System 10 can include handle 500 that can control operation of dosing device 600. For example, handle 500 can include bar 505 that, when pushed down (e.g., in the direction of arrow 3) handle 500 can move from the first position (shown in FIG. 7A) to the second position (shown in FIG. 7B). In FIGS. 8 and 9, handle 500 shows the handle in the first position and handle 500' shows the handle in the second position. In some embodiments, pushing bar 505 down causes arms 501 to rotate dosing device 600 about axis 2 enough to dispense a single dose. As dosing device 600 rotates, one dosing volume (e.g., dosing volume 601) rotates from sealed within body 100 to being exposed downwardly to outlet opening 131 (e.g., as shown in FIGS. 7A and 7B) and a second dosing volume (e.g., dosing volume 604 can rotate from not being sealed within body 100 to being sealed within body 100.

In some embodiments, handle 500 includes two arms 501 that are connected by bar 505. In some embodiments, handle 500 includes projections 510 that extend inward from arms 501. In some embodiments, projections 510 align with notches of ratchet wheel 625 such that when handle 500 moves from the first position to the second position, projections 510 cause ratchet wheel 625 to rotate about axis 2, rotating dosing device 600. In some embodiments, each arm 501 couples to one of the side walls 615 of dosing device 600, which can increase stability of handle 500 and ease of use. For example, coupling to both sides of dosing device 600 minimizes the risk that the handle could disengage from dosing device 600 in use and ensure even rotation forces on dosing device 600. It can also help prevent dosing device from becoming canted or jammed during operation, by providing even force on both sides of dosing device 600.

In some embodiments, handle 500 moves from the first position (shown in FIG. 7A) to the second position (shown in FIG. 7B) in response to a downward force applied to bar 505 (e.g., in the direction of arrow 3). In some embodiments, handle 500 includes springs 515. In some embodiments, each spring 515 has a first end that that is coupled to arm 501. In some embodiments, spring 515 has a second end that is coupled to body 100 or shell 200. For example, as shown in FIG. 9, in some embodiments, spring 515 is coupled to protrusion 230 of shell 200.

In some embodiments, each spring 515 is a tension spring that applies force on handle 500 such that when a downward force is not being applied to bar 505, handle 500 returns to the first position (i.e., handle 500 is biased toward the first position). In some embodiments, handle 500 returns to the first position from the second position without user interaction. In some embodiments, handle 500 includes openings 530 that receive protrusion 135 on body 100. As shown in FIGS. 8 and 9, each opening 530 can have an oval shape. As shown in FIGS. 8 and 9 protrusion 135 extends through opening 530 and restricts movement of handle 500. In FIGS. 8 and 9, handle 500 is in the first position and handle 500' is shown in phantom in the second position for illustration.

As shown, protrusion 135 is smaller than and fits within opening 530 such that handle 500 can rotate about protrusion 135. In embodiments where opening is oval-shaped (i.e., longer in one direction) as shown, handle 500 can rotate and translate relative to protrusion 135 while protrusion 135 remains within opening 530. This movement can help facilitate repeated operation of handle 500 to dispense consecutive doses, as described in more detail elsewhere herein.

FIGS. 7A and 7B show cross-section views of system 10 (without base 400) along lines 7-7 shown in FIG. 4. In some embodiments, as shown in FIGS. 7A and 7B, flowable solid 800 is disposed in storage volume 120 of body 100. FIGS. 7A and 7B illustrate dispensing a dose of flowable solid 800. FIG. 7A illustrates system 10 when handle 500 is in the first position. FIG. 7B illustrates system 10 when handle 500 is in the second position.

As illustrated in FIG. 7A, when handle 500 is in the first position, flowable solid 800 can be disposed within storage volume 120 and can be prevented from exiting storage volume 120 by dosing device 600. In some embodiments, dosing device 600 rotates about axis 2 each time handle 500 moves from the first position to the second position. In some embodiments, dosing device 600 rotates forwards (e.g., towards front wall 105 of body 100 in the direction shown by arrow 4). In some embodiments, dosing device 600 rotates backwards (e.g., away from front wall 105 of body 100 opposite the direction shown by arrow 4). In some embodiments, each rotation is incremental. Each incremental rotation may be less than one full rotation of dosing device 600. In some embodiments, a full rotation equals 3 to 8 (e.g., 3 to 5) incremental rotations. In some embodiments, a full rotation equals 5 incremental rotations. In some embodiments, each incremental rotation is equal to the angle between each wall 610 (e.g., angle A). In some embodiments, angle A is between 30° and 180° (e.g., 45° and 120° or 60° to 90°). In some embodiments, angle A is 45°, 60°, 72°, 90° or 120°. In some embodiments, angle A is 72°. In some embodiments, dosing device 600 does not rotate when handle 500 moves from the second position to the first position.

Dosing device 600 can have rotational symmetry at a cross-section through its center. For example, the embodiments shown in the figures has an order of rotational symmetry of 5. Dosing device 600 can have an order of rotational symmetry of 3 to 8 (e.g., 3 to 5).

In some embodiments, at least one dosing volume (e.g., dosing volumes 601, 602, 603, 604, 605) is in communication with storage volume 120. In some embodiments, three dosing volumes can be in communication with storage volume 120 at the same time. For example, as shown in FIG. 7A, dosing volumes 601, 602, and 603 can be in communication with storage volume 120.

Flowable solid 800 can fall into dosing volumes of dosing device 600 by gravity. For example, when flowable solid 800 is poured in to storage volume 120 through inlet 128, flowable solid 800 can fill each dosing volume that is in communication with storage volume 120 (e.g., dosing volumes 601, 602, 603 in FIG. 7A) and excess flowable solid 800 can remain in storage volume 120. As shown in FIG. 7A, flowable solid 800 fills all of each dosing volume 601, 602, and 603 that is in communication with storage volume 120. A benefit of a dosing device that rotates about a horizontal axis, such as dosing device 600, is that it avoids dead spots that would result from rotation about a vertical axis. These dead spots can accumulate flowable solid that cannot move into a dosing volume, which can waste flowable solid and can complicate cleaning. As shown in FIG. 7A, dosing volumes 604 and 605 are not in communication with storage volume 120, and dosing volume 605 is in communication with outlet opening 131 of outlet 130.

FIG. 7B illustrates system 10 when handle 500 has been moved to the second position. In some embodiments, handle 500 moves from the first position (shown in FIG. 7A) to the second position (shown in FIG. 7B) in response to a downward force applied to handle 500 (e.g., in the direction of arrow 3).

In some embodiments, projection 510 contacts ratchet wheel 625, as shown in FIG. 8, such that as handle 500 moves to the second position, ratchet wheel 625 rotates dosing device 600. In some embodiments, pawl 630 can be positioned to prevent ratchet wheel 625 from rotating more than one increment, as discussed above. In some embodiments, dosing device rotates towards front wall 105 of body 100 (e.g., in the direction shown by arrow 4). In some embodiments, dosing device 600 can rotate only in the direction of arrow 4.

FIG. 7B illustrates system 10 after one incremental rotation from the system 10 shown in FIG. 7A. As shown in FIG. 7B, as dosing device 600 rotates one incremental turn, dosing volume 601 rotates such that it is in communication with outlet opening 131 of outlet 130. As this happens, dosing device dispenses one dose 805 of flowable solid 800 by gravity through outlet opening 131, leaving the remainder 810 of flowable solid 800 in storage volume 120. As shown in FIG. 7B, as dosing device 600 rotates one incremental turn, dosing volume 604 rotates such that it is in communication with storage volume 120. As this happens, some of remainder 810 of flowable solid 800 falls into dosing volume 604 to fill dosing volume 604.

The sequence described above related to FIGS. 7A and 7B can be repeated until no more flowable solid 800 remains in storage volume 120. For example, in some embodiments, each time handle 500 moves from the first position to the second position, dosing device 600 rotates such that a first dosing volume is exposed to the outlet opening 131 and dispenses a dose 805 of flowable solid 800 and a second dosing volume is exposed to storage volume 120 and receives flowable solid 800 from remainder 810.

Body 100 can include a rail 155 that is configured to couple with cover 160, as shown in FIGS. 7A and 7B. Cover 160 can restrict movement of flowable solid 800 from storage volume 120 to dosing chamber 125 as dosing device 600 rotates about axis 2. For example, as dosing device 600 rotates, wall 610 and cover 160 can together prevent excess flowable solid 800 from exiting the storage volume. In some embodiments, cover 160 extends the length of dosing device 600 in the direction of axis 2.

FIGS. 8 and 9 show a cross-section views of system 10 (without base 400) along lines 8-8 and 9-9, respectively. As shown in FIG. 8, handle 500 is in the first position, and handle 500' is shown in phantom to illustrate the position of handle 500 in the second position. As shown in FIG. 8, projection 510 contacts a notch of ratchet wheel 625, and as handle moves to the position illustrated by handle 500', projection 510 causes ratchet wheel 625, which rotates dosing device 600 one increment. As shown in FIG. 8, when handle 500 is in the first position, protrusion 135 is disposed at a front of opening 530, and when handle 500 is in the second position, protrusion 135 is disposed at a back of opening 530. This translation allows projection 510 to disengage from the notch and re-engage with the notches of ratchet wheel 625. In some embodiments, ratchet wheel is coupled to dosing device 600 and is fixed relative to the body of dosing device 600.

As shown in FIG. 9, pawl 630 can be coupled to protrusion 145. In some embodiments, as projection 510 rotates ratchet wheel 625, ratchet wheel 625 releases from pawl 630, and as it rotates, pawl 630 can catch the next notch of ratchet wheel 625 to prevent further rotation. In some embodiments, spring 635 is coupled to pawl 630. In some embodiments, spring 635 is a compression spring.

In some embodiments, system 10 includes shield 700 coupled to body 100. In some embodiments, shield 700 includes arms 705, cover 710, and opening 715 defined in part by arms 705 and cover 710. In some embodiments, shield 700 is coupled to shell 200 and such that shell 200 and arms 705 define opening 715. In some embodiments, outlet 130 is disposed at least partially within opening 715.

As used herein, the terms "top," "bottom," "front," "back," and the like are intended to assist in understanding of embodiments of the disclosure with reference to the accompanying drawings with respect to the orientation of as shown, and are not intended to be limiting to the scope of the disclosure or to limit the disclosure scope to the embodiments depicted in the Figures. The directional terms are used for convenience of description and it is understood that may be positioned in any of various orientations.

It is to be appreciated that the Detailed Description section, and not any other section, is intended to be used to interpret the claims. Other sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above examples are illustrative, but not limiting, of the present disclosure. Other suitable modifications and adaptations of the variety of conditions and parameters normally encountered in the field, and which would be apparent to those skilled in the art, are within the spirit and scope of the disclosure.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The breadth and scope of the present disclosure should not be limited by any of the above-described exemplary embodiments, but should be defined only in accordance with the claims and their equivalents.

What is claimed is:

1. A system for dispensing a flowable solid, the system comprising:
    a body comprising:
        a front wall, a back wall, a first side wall, and a second side wall;
        a storage volume defined at least in part by the front wall, the back wall, the first side wall, and the second side wall by the body;
        an inlet;
        an outlet disposed at a bottom of the body; and
        a dosing chamber disposed between the storage volume and the outlet, the dosing chamber comprising a third side wall and a fourth side wall;
    a dosing device disposed at least partially within the dosing chamber, the dosing device rotatable about a first horizontal axis extending parallel to the front wall between the first third side wall and the second fourth side wall, the dosing device comprising:
        a central shaft extending along the first horizontal axis,
        a plurality of walls extending radially outward from the central shaft,
        a plurality of dosing volumes defined in part by the plurality of walls, wherein each dosing volume is configured to hold one dose of the flowable solid,
        wherein the dosing device is configured to restrict flow of the flowable solid from the storage volume to the outlet,
        wherein the dosing device is configured to rotate incrementally about the first horizontal axis such that one dose of the flowable solid is dispensed through the outlet with each incremental rotation,
    a handle coupled to the body, the handle configured to move between a first position and a second position, the handle comprising a bar extending parallel to the front wall, and the handle configured to rotate about a second horizontal axis that is parallel to and spaced apart from the first horizontal axis,
    wherein the dosing device is configured to rotate through a single incremental rotation each time the handle moves from the first position to the second position to dispense a dose of the flowable solid, and
    wherein the handle is directly coupled to the body.

2. The system of claim 1, wherein the plurality of dosing volumes includes a first dosing volume,
    wherein, when the handle is in the first position, the first dosing volume is in communication with the storage volume, and
    wherein, in response to a downward force applied to the handle, the dosing device rotates such that the first dosing volume is in communication with the outlet.

3. The system of claim 1, wherein a first dosing volume of the plurality of dosing volumes is in communication with the storage volume, and a second dosing volume of the plurality of dosing volumes is not in communication with the storage volume.

4. The system of claim 3, wherein the first dosing volume is configured to receive the flowable solid from the storage volume by gravity.

5. The system of claim 1, wherein the dosing device comprises a first dosing device side wall disposed at a first end of the central shaft and a second dosing device side wall disposed at a second end of the central shaft, wherein the first dosing device side wall and the second dosing device side wall are each oriented perpendicular to the first horizontal axis and perpendicular to the plurality of walls of the dosing device.

6. The system of claim 5, wherein:
the plurality of walls comprises a first dosing device wall and a second dosing device wall; and
a first dosing volume of the plurality of dosing volumes is defined in part by the first dosing device wall, the second dosing device wall, the first dosing device side wall, and the second dosing device side wall.

7. The system of claim 1, wherein the handle comprises a first arm coupled to the first side wall and a second arm coupled to the second side wall.

8. The system of claim 1, wherein the dosing device is configured to be removed from the body and reattached to the body.

9. The system of claim 1, wherein when the handle moves from the second position to the first position, the dosing device does not rotate.

10. The system of claim 1, wherein a full rotation of the dosing device is equal to 3 to 5 incremental rotations.

11. The system of claim 1, wherein the handle is coupled to the body by a tension spring, wherein the tension spring extends as the handle moves from the first position to the second position.

12. The system of claim 1, further comprising:
a ratchet wheel coupled to the dosing device; and
wherein the handle comprises a projection that engages with the ratchet wheel to rotate the ratchet wheel when the handle moves from the first position to the second position.

13. The system of claim 1, wherein the handle is configured to move from the first position to the second position in response to a downward force applied to the handle, and
wherein the dosing device is configured to rotate in response to the downward force applied to the handle.

14. The system of claim 1, wherein each incremental rotation is about 45 degrees to about 90 degrees.

15. The system of claim 1, wherein each dose has an equal volume.

16. The system of claim 1, wherein the handle is coupled to a first side wall of the dosing device and to a second side wall of the dosing device.

17. The system of claim 16, wherein the handle comprises a first arm extending parallel to the first side wall of the body and a second arm extending parallel to the second side wall of the body.

18. The system of claim 17, wherein the first side wall of the dosing device and the second side wall of the dosing device are each oriented perpendicularly to the first horizontal axis and to the plurality of walls extending radially outward from the central shaft.

19. The system of claim 1, further comprising a shell, the shell comprising walls and a closure,
wherein the body, the dosing device, and the handle are disposed at least partially within the shell.

20. The system of claim 1, further comprising a base disposed below the body, wherein the base comprises an open front.

21. A system for dispensing a flowable solid, the system comprising:
a body comprising a storage volume, an inlet, an outlet, and a dosing chamber;
a dosing device disposed at least partially in the dosing chamber, the dosing device comprising:
a central shaft extending between a first side wall of the body and a second side wall of the body along a first horizontal axis that extends parallel to a front of the body; and
a plurality of dosing volumes defined by walls extending radially outward from the central shaft,
the dosing device being rotatable about the first horizontal axis,
the dosing device configured to restrict flow of the flowable solid from the storage volume to the outlet; and
a handle comprising:
a first arm coupled to the first side wall; and
a second arm coupled to the second side wall,
wherein the handle is configured to move between a first position and a second position, the handle configured to move from the first position to the second position in response to a downward force applied to the handle, and
wherein the handle is configured to rotate about a second horizontal axis that is parallel to and spaced apart from the first horizontal axis;
wherein the dosing device is configured to rotate incrementally in response to the handle moving from the first position to the second position, wherein the dosing device is configured to dispense a dose of the flowable solid with each incremental rotation,
wherein each dose has an equal volume, and
wherein the handle is directly coupled to the body.

22. The system of claim 21, wherein the dosing device is configured to not rotate when the handle moves from the second position to the first position.

23. The system of claim 21, wherein the plurality of dosing volumes includes a first dosing volume,
wherein, when the handle is in the first position, the first dosing volume is in communication with the storage volume, and
wherein, as the handle moves from the first position to the second position, the dosing device rotates such that the first dosing volume is in communication with the outlet.

24. The system of claim 21, wherein the handle comprises a bar extending parallel to a front wall, and wherein the first arm and the second arm each extend in a direction perpendicular to the bar.

* * * * *